US011580371B2

(12) United States Patent
Mital

(10) Patent No.: US 11,580,371 B2
(45) Date of Patent: Feb. 14, 2023

(54) METHOD AND APPARATUS TO EFFICIENTLY PROCESS AND EXECUTE ARTIFICIAL INTELLIGENCE OPERATIONS

(71) Applicant: Roviero, Inc., San Jose, CA (US)

(72) Inventor: Deepak Mital, San Jose, CA (US)

(73) Assignee: Roviero, Inc., San Jose, CA (US)

( * ) Notice: Subject to any disclaimer, the term of this patent is extended or adjusted under 35 U.S.C. 154(b) by 374 days.

(21) Appl. No.: 16/817,416

(22) Filed: Mar. 12, 2020

(65) Prior Publication Data
US 2020/0293868 A1 Sep. 17, 2020

Related U.S. Application Data

(60) Provisional application No. 62/944,473, filed on Dec. 6, 2019, provisional application No. 62/818,027, filed on Mar. 13, 2019.

(51) Int. Cl.
*G06F 17/16* (2006.01)
*G06N 3/063* (2023.01)
*G06F 9/38* (2018.01)
*G06F 9/48* (2006.01)

(52) U.S. Cl.
CPC .......... *G06N 3/063* (2013.01); *G06F 9/3836* (2013.01); *G06F 9/3885* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 11,392,829 B1 | * | 7/2022 | Pool | G06N 3/08 |
| 2018/0157969 A1 | * | 6/2018 | Xie | G06F 7/57 |
| 2018/0293691 A1 | * | 10/2018 | Nurvitadhi | G06T 1/60 |
| 2018/0315158 A1 | * | 11/2018 | Nurvitadhi | G06T 1/20 |
| 2018/0357537 A1 | * | 12/2018 | Munkberg | G06N 3/063 |
| 2019/0278600 A1 | * | 9/2019 | Frumkin | G06N 3/0472 |
| 2020/0293868 A1 | * | 9/2020 | Mital | G06N 3/08 |

* cited by examiner

*Primary Examiner* — Hyun Nam
(74) *Attorney, Agent, or Firm* — Rutan and Tucker, LLP

(57) ABSTRACT

A method, apparatus, and system are discussed to efficiently process and execute Artificial Intelligence operations. An integrated circuit has a tailored architecture to process and execute Artificial Intelligence operations, including computations for a neural network having weights with a sparse value. The integrated circuit contains at least a scheduler, one or more arithmetic logic units, and one or more random access memories configured to cooperate with each other to process and execute these computations for the neural network having weights with the sparse value.

16 Claims, 7 Drawing Sheets

M = Number of output planes
K = Number of input planes * Filter Dimensions
N = Output size

METHOD AND APPARATUS TO EFFICIENTLY PROCESS AND EXECUTE ARTIFICIAL INTELLIGENCE OPERATIONS

RELATED APPLICATION

This application claims the benefit under 35 USC 119 of U.S. Provisional Patent Application No. 62/818,027, filed Mar. 13, 2019, titled "Method to fully utilize all the compute elements in an IC implementing neural network," and U.S. Provisional Patent Application No. 62/944,473, filed Dec. 6, 2019, titled "A method and apparatus to efficiently do computation for neural networks," which are hereby incorporated herein by reference in their entirety.

FIELD

Embodiments generally relate to an apparatus and a method to efficiently process and execute Artificial Intelligent operations. In an embodiment an application specific processor or field-programmable gate array is tailored to efficiently do computations for neural networks.

SUMMARY

Provided herein are some embodiments. In an embodiment, the design is directed to an apparatus and a method to efficiently do computation for neural networks.

The integrated circuit, such as an application specific processor, field-programmable gate array (FPGA), or similar integrated circuit, efficiently processes and executes Artificial Intelligence operations. The integrated circuit has a tailored architecture to process and execute Artificial Intelligence operations, including computations for a neural network having weights with a sparse value. The integrated circuit contains a scheduler, one or more arithmetic logic units, and one or more random access memories configured to cooperate with each other to process and execute these computations for the neural network having weights with the sparse value.

These and other features of the design provided herein can be better understood with reference to the drawings, description, and claims, all of which form the disclosure of this patent application.

BRIEF DESCRIPTION OF THE DRAWINGS

The multiple drawings refer to the example embodiments of the design.

Figure 1:
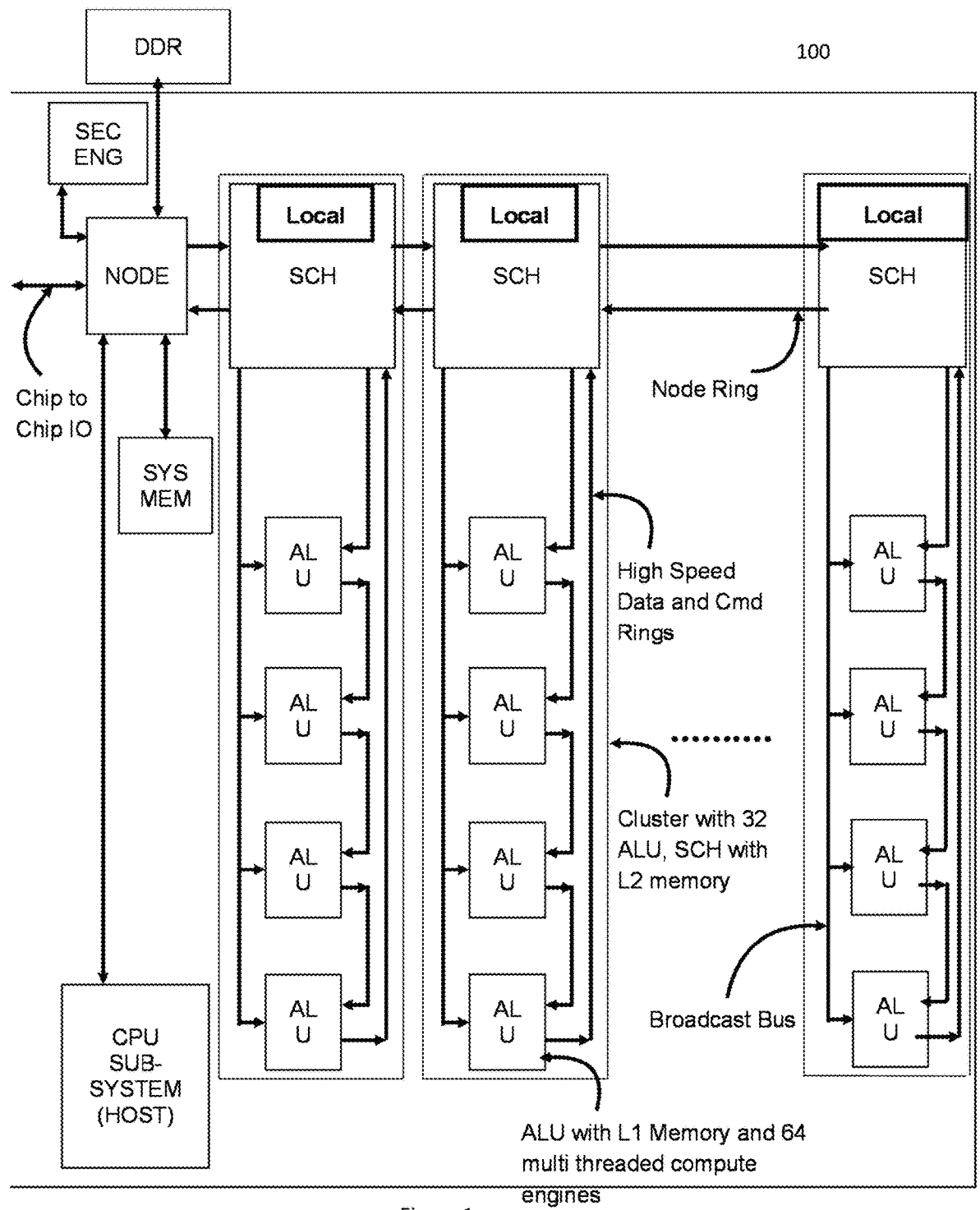
FIG. 1 illustrates a diagram of an example embodiment of an integrated circuit with a tailored architecture to efficiently process and execute Artificial Intelligence operations.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific data signals, named components, number of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first computing engine, can be made. However, the specific numeric reference should not be interpreted as a literal sequential order but rather interpreted that the first computing engine is different than a second computing engine. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

The apparatus and method to efficiently do computation for neural networks have many features and some example features will be discussed below.

FIG. 1 illustrates a diagram of an example embodiment of an integrated circuit 100 with a tailored architecture to efficiently process and execute Artificial Intelligence operations. The integrated circuit 100 efficiently processes and executes Artificial Intelligence operations. The integrated circuit 100 has adapted components to process and execute Artificial Intelligence operations, including computations for a neural network having weights with a sparse value. The integrated circuit 100 contains a scheduler (SCH), one or more arithmetic logic units (ALUs), a communication bus, a mode controller, and one or more random access memories configured to cooperate with each other to process and execute these computations for the neural network having weights with the sparse value. The neural network processor is configured to handle sparse neural networks i) without loss in compute utilization or ii) significantly increase internal and/or external memory requirements as well as iii) consume lower power while doing the computations. Thus, the neural network processor can be configured to handle sparse neural networks with a low memory requirement and lower power consumption requirement.

Figure 2:
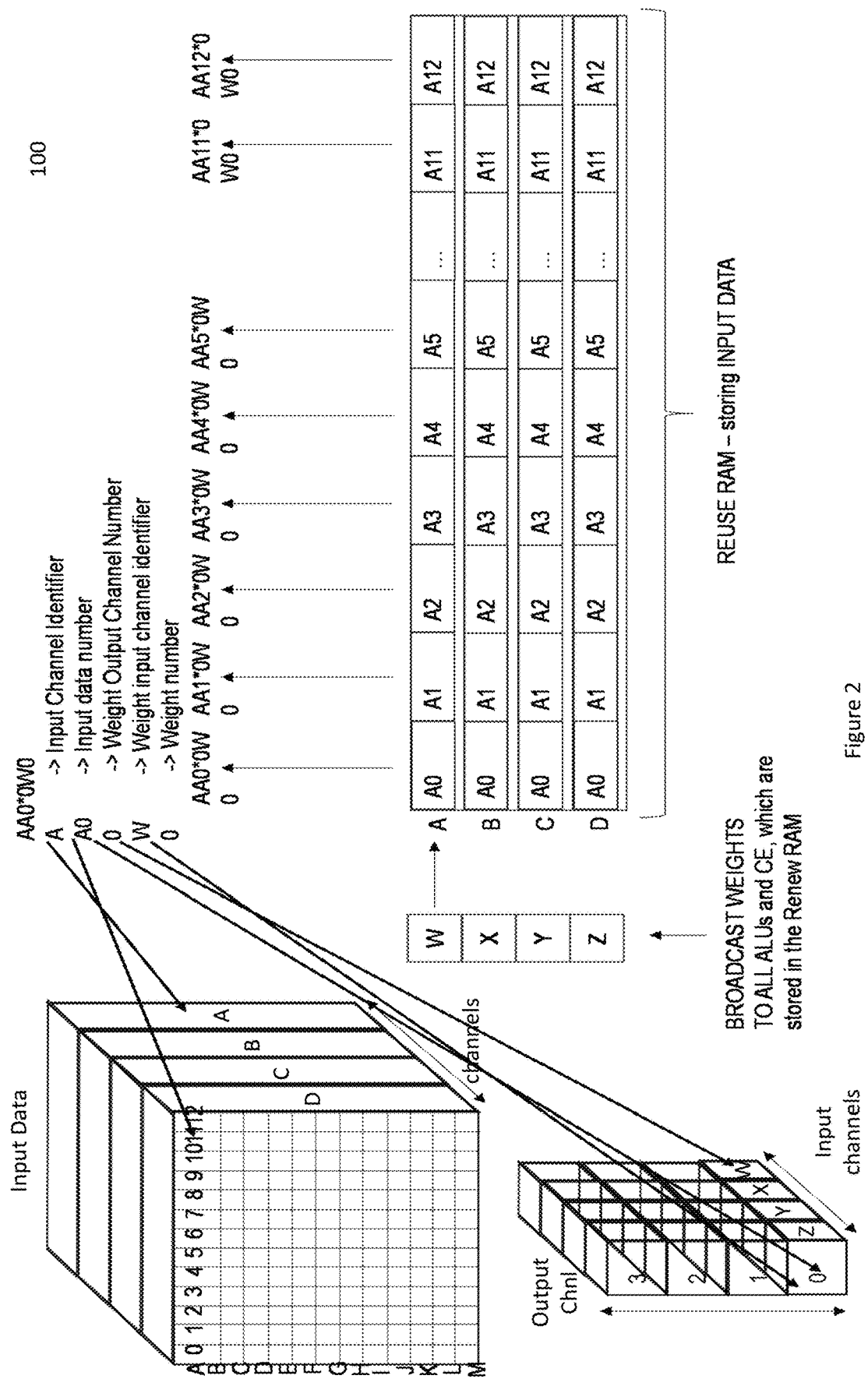
FIG. 2 illustrates a diagram of an example embodiment of a mode controller and a compiler cooperating to operate in a first mode where the input data from input channels is loaded into the reuse RAM and the set of weights for the neural network are loaded into a renew RAM.

FIG. 2 illustrates a diagram of an example embodiment of a mode controller and a compiler cooperating to operate in a first mode where the input data from input channels is loaded into the reuse RAM and the set of weights for the neural network are loaded into a renew RAM. The mode controller and the compiler cooperate to receive a software input from the user on whether to operate the integrated circuit 100 in one of multiple operational modes in order to more efficiently perform calculations for different types of neural network. As shown, in a first mode, the input data from input channels is loaded into the reuse RAM and the set of weights for the neural network are loaded into a renew RAM. In a second mode, the input data from input channels is loaded into the renew RAM and the set of weights for the neural network are loaded into the reuse RAM.

In an embodiment, the neural network processor and its compiler are constructed to operate in two modes—Mode0 and Mode1. In the mode0, the input data (which is anticipated as being the largest amount of static data being used in the calculations) is loaded into the reuse RAM of the neural network processor and weights for the neural network are loaded into the renew RAM of the neural network processor. Similarly, in mode1 the input data is loaded into the renew RAM and the weights (which are now anticipated as being the largest amount of static data being used in the calculations) are loaded into the reuse RAM.

The compiler for the neural network processor uses a descriptor/instruction set with specific instructions crafted to efficiently handle various operations for neural networks.

Each arithmetic logic unit can be instantiated with multiple compute engines (CEs) via a user configurable RTL setting for the FPGA. Each ALU contains the RAM memory to feed data and weights into each CE and also store the output result from the CE. Note, a FPGA is merely being used as an example type of processor and this design may be implemented with other types of processors, such as an ASIC.

Note, an adder exists to supplement the RAM memory when the number of input channels and/or amount of weights exceeds the depth of the RAM (Reuse RAM or Renew RAM depending on the mode) that is being used to store the channel data and/or weights. Thus, if the full set of data or weights cannot be calculated at the same time by the ALU, it can split the calculation load into multiple sessions and use the adder in combination with the RAM to still internally perform the entire calculation without the need to store partial results of the calculation in an external memory.

In the neural network processor, the scheduler is responsible for sending data to each of the multiple ALUs connected to it via the broadcast bus for parallel processing.

Figure 3:
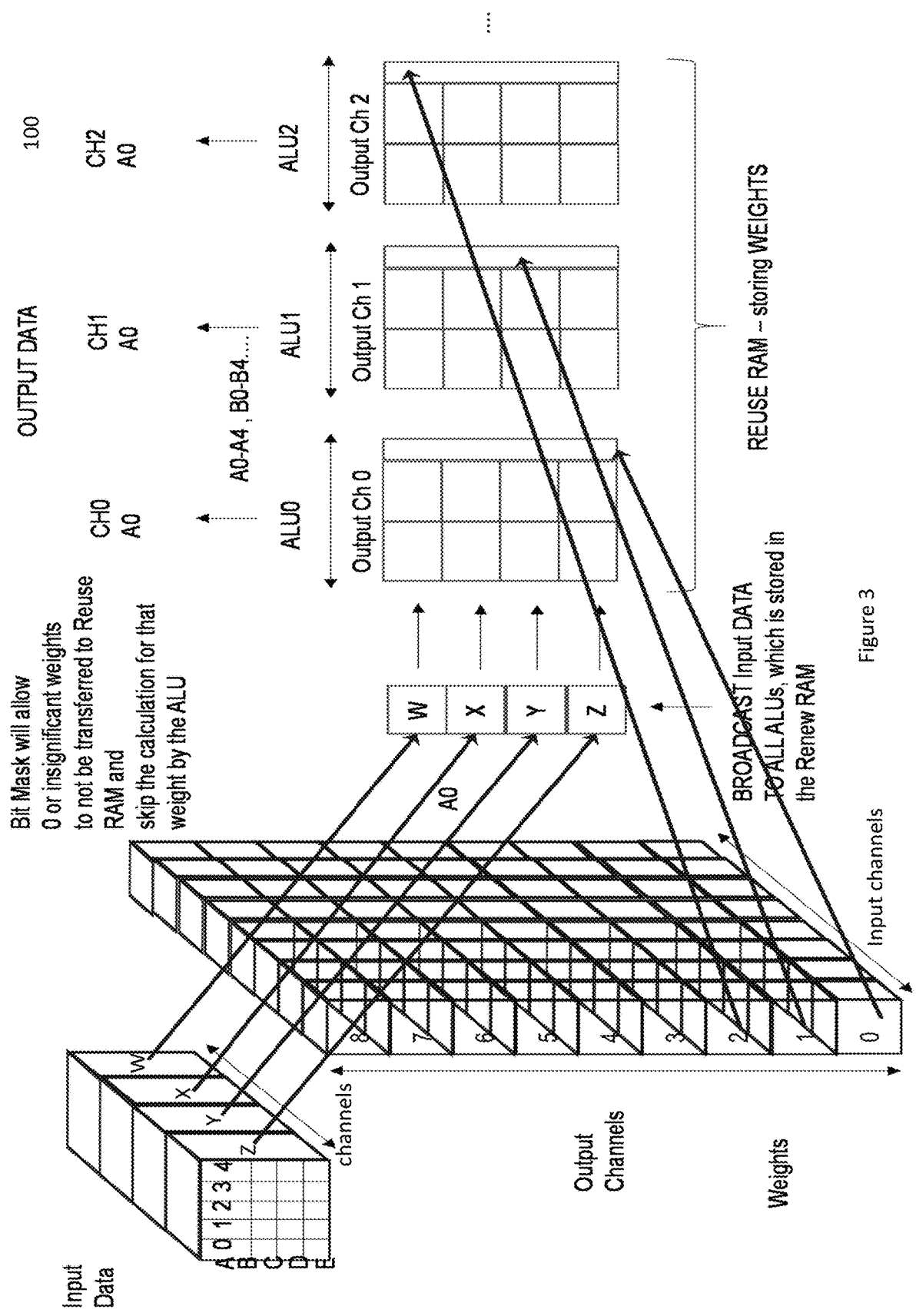
FIG. 3 illustrates a diagram of an example embodiment of a compiler configured to create a bit mask that accompanies input data from input channels of the neural network, where the bit mask corresponds to a set of weights for the neural network when one or more of the weight values for the set of weights have the sparse value.

FIG. 3 illustrates a diagram of an example embodiment of a compiler configured to create a bit mask that accompanies input data from input channels of the neural network, where the bit mask corresponds to a set of weights for the neural network when one or more of the weight values for the set of weights have the sparse value. Regarding the weights, the neural network may contain sparse weights that are either zero or are not important for the network or AI operation. These sparse weights are removed via the bit mask via calculation being skipped and/or value not communicated.

A compiler of the integrated circuit 100 may create a bit mask that accompanies input data from input channels of the neural network. The bit mask corresponds to a set of weights for the neural network when one or more of the weight values for the set of weights have the sparse value. Each arithmetic logic unit may decode the bit mask to i) identify which weights from the set of weights have values that should be 1) transferred across a communication bus into reuse RAM and 2) subsequently used in the computations for the neural network and ii) identify which weights that have a sparse value, where 1) the weights that have a sparse value will have a calculation for that weight skipped as well as 2) the weights that have the sparse value will not be transferred across the communication bus into the reuse RAM. Thus, the bit mask saves power consumption associated with transfer and loading of RAM as well as saves compute cycles. Thus, the compiler can be configured to create a Bit mask to accompany actually significant (non-zero weight) data corresponding to the weights when one or more of the weight values are sparse weights. The compiler is configured to interrogate the weights and create the bit mask when it is made aware of a set of weights for a neural network that has sparse weights. The bit mask sent by the scheduler to the ALU can be decoded to identify which weights have values that should be calculated and identify sparse weights where the calculation for that weight can be skipped.

In an embodiment, a Node DMA engine talks and interfaces with a compiler, an external host CPU and an external memory. The Node DMA engine performs Hoffman decoding of the bit mask delivered from the compiler. The bit mask will allow 0 or insignificant weights to not have to be transferred (saving power on that bus wire) and skip the calculation at the ALU (again saving power and time). The architecture of this neural network processor allows the external memory to be read merely due to the internal data flow optimizations so the external memory can be nonvolatile as well volatile memory.

Figure 4:
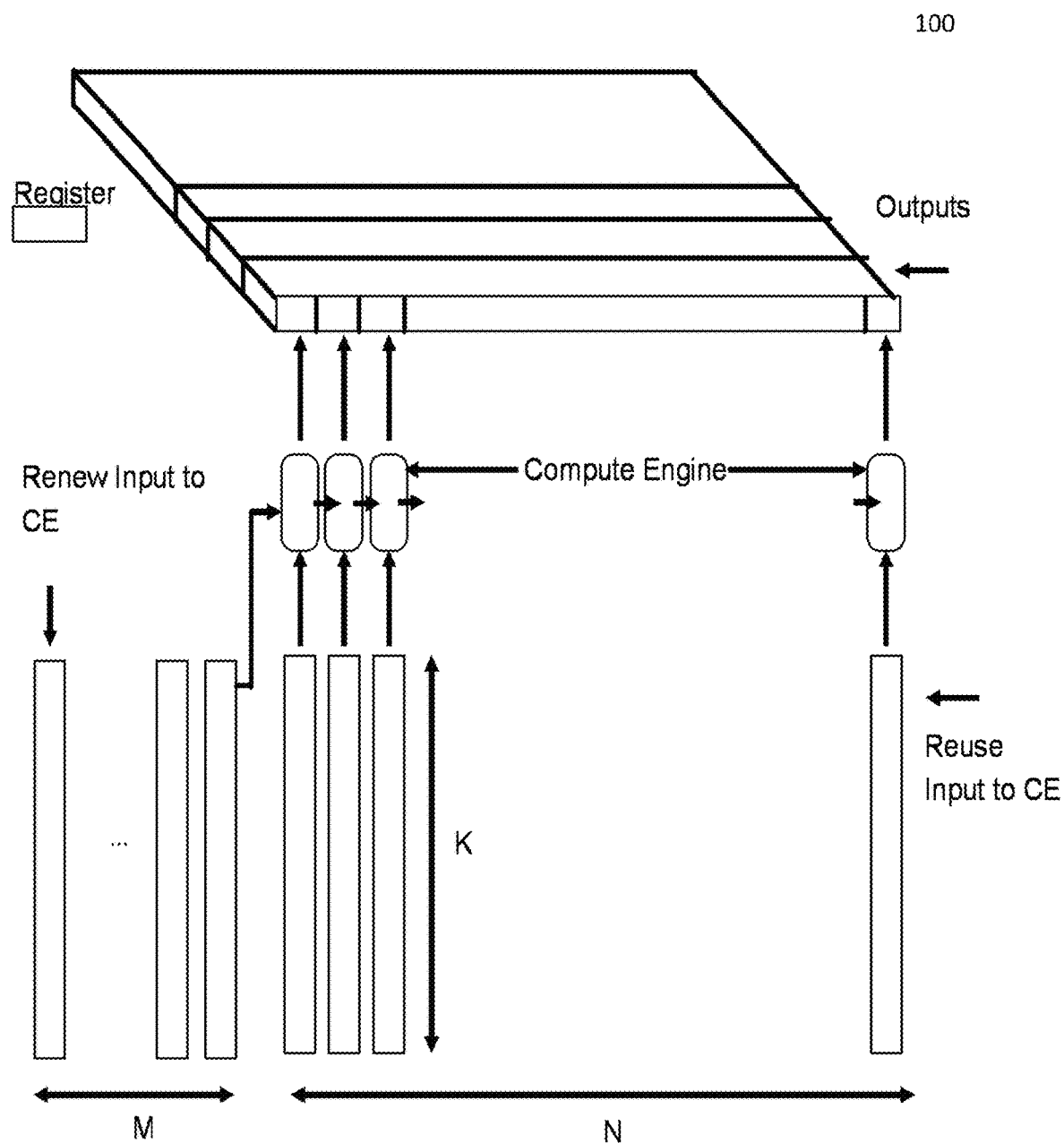
FIG. 4 illustrates a diagram of an example embodiment of an arithmetic logic unit that is configurable to be instantiated with multiple compute engines, where the arithmetic logic unit contains an instance of a renew RAM and an instance of the reuse RAM to i) feed the input data and the set of weights into each compute engine and ii) to also store an output result from a calculation from that compute engine.

FIG. 4 also shows a reuse RAM cooperating with the scheduler to be loaded merely one time per calculation session with a larger amount of data between i) a set of weights and ii) input data from input channels, for the neural network in which the larger amount of data is to be reused multiple times during a given calculation session. In this example, the reuse RAM stores the values of the weights used in the neural network. The larger amount of data loaded into the reuse RAM stays put during the calculation session, which generates multiple outputs. The larger amount of data is loaded into the reuse RAM merely once; rather than, having to move that large amount of data bytes around multiple times during the calculation session. Thus, Reuse RAM gets loaded a single time per calculation session with the larger amount of data between i) weights and ii) input data from all of the input channels, which is reused multiple times (usually static data). The Renew RAM is loaded with the other set of data either i) weights or ii) input data, which can changed and/or moved around during the calculation session. Thus, the larger amount of static data stays put during the calculation session, which saves time and lots of power consumption because you need not move or reload this data in a different storage location than the Reuse RAM.

The Reuse RAM and Renew RAM are used rather than a register because the data sets and/or set of weights can be very large as well as small and medium. The use of RAM accommodates this variable set of possibly a lot of data better than a register. The ALU can use a read pointer for the RAM. Note, the read pointer will jump over a calculation for the 3D object each time a sparse weight is indicated by the bit mask. Also, the neural network processor is configured to have a data path organization that can use embedded non-volatile memory.

FIG. 4 illustrates a diagram of an example embodiment of an arithmetic logic unit that is configurable to be instantiated with multiple compute engines. The arithmetic logic unit of the integrated circuit 100 contains an instance of a renew RAM and an instance of the reuse RAM to i) feed the input data and the set of weights into each compute engine and ii) to also store an output result from a calculation from that compute engine.

The neural network processor can be implemented as a FPGA. The FPGA is scalable on amount of ALUs instantiated via user configurable parameter set in the RTL. Each ALU can instantiate multiple CEs via the user configurable RTL setting for the FPGA. The depth of the Reuse RAM and Renew RAM in each ALU can also be set via the user configurable RTL setting. The size of the Reuse RAM is flexible and can be parameterized.

Each arithmetic logic unit is configurable to be instantiated with multiple compute engines via a user configurable register transfer language (RTL) setting. Each arithmetic logic unit contains an instance of a renew RAM and an instance of the reuse RAM to i) feed the input data and the set of weights into each compute engine and ii) to also store an output result from a calculation from that compute engine.

FIG. 4 illustrates a diagram of an example embodiment of an arithmetic logic unit that has multiple compute engines, where each neighboring compute engine is configured to communicate and receive a computed output of a downstream compute engine, except for an initial compute engine. Each arithmetic logic unit has multiple compute engines. Each neighboring compute engine can communicate and receive a computed output of a downstream compute engine, except for an initial compute engine. Each downstream compute engine has a register to store an output of the downstream compute engine as its input.

Typically, there are multiple compute engines per ALU. A compute engine supplies its output result as an input into an input register of a neighboring compute engine. Thus, each neighboring compute engine communicates and receives the computed output of the earlier compute engine. Each compute engine has a register to store the output of the downstream compute engine as its input.

Figure 5:
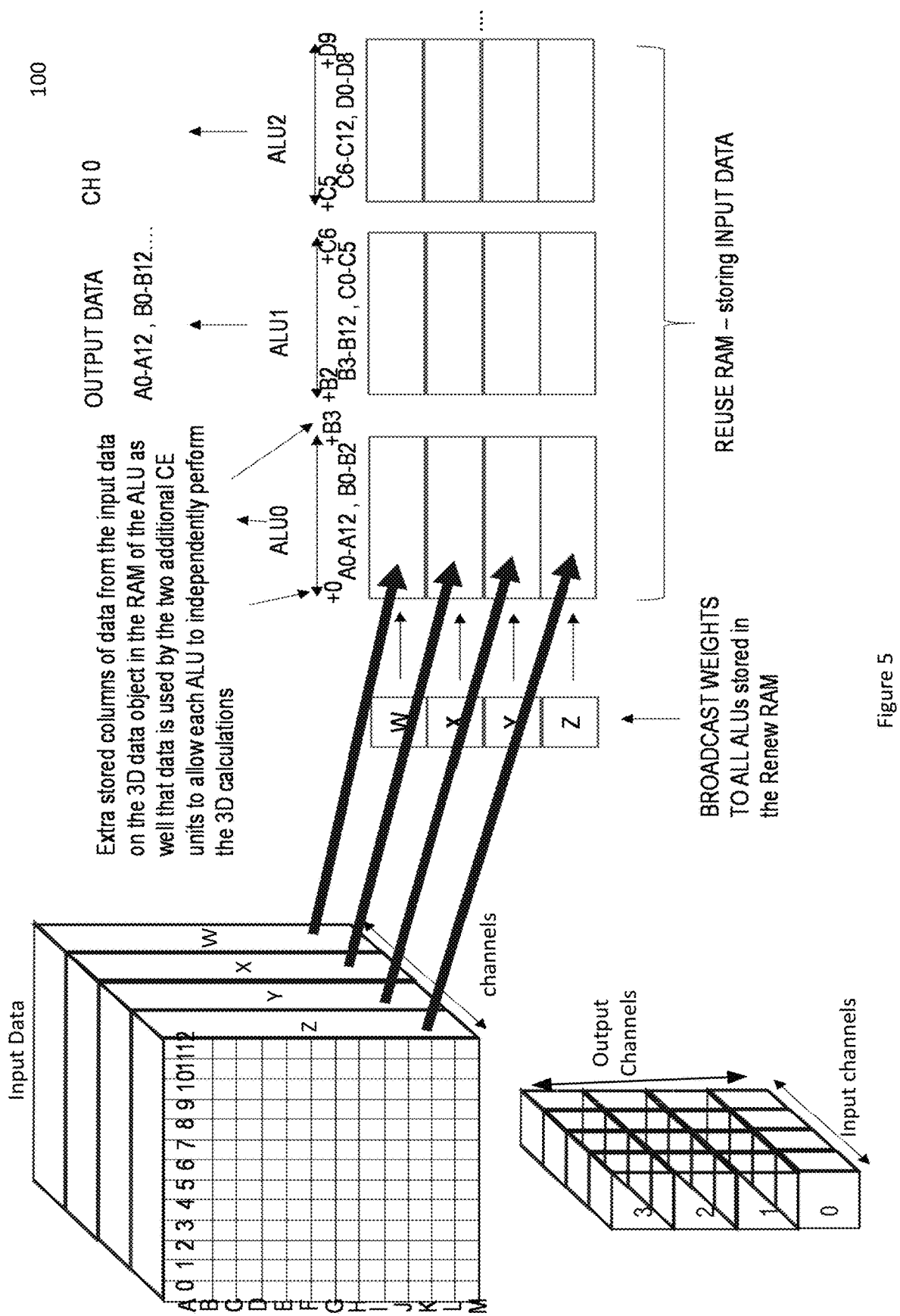
FIG. 5 illustrates a diagram of an example embodiment of an ALU that has a RAM width of memory cells set in a reuse RAM to have an additional two or more columns of greater than an amount of columns needed to store input data from input channels in order to allow the ALU to independently perform the calculations for the 3D data object.

FIG. 5 illustrates a diagram of an example embodiment of an ALU that has a RAM width of memory cells set in a reuse RAM to have an additional two or more columns of greater than an amount of columns needed to store input data from input channels in order to allow the ALU of the integrated circuit 100 to independently perform the calculations for the 3D data object.

The scheduler can feed descriptors tailored to 3D objects and weights for neural networks to these multiple parallel ALU compute units. The descriptors/instructions are utilized with the compiler and a node DMA engine that inherently handle three dimensional data and how to efficiently work with neural networks that have sparse weights that are either zero or are not important for the network or AI operation. Each ALU can have a RAM width of memory cells set in a reuse RAM to have an additional two or more columns of greater than an amount of columns needed to store input data from input channels. The additional two or more columns of data from the input data for a 3D data object are configured to store a left data value and a right data value of a current weight being calculated by the first ALU, in order to allow the first ALU to independently perform the calculations for the 3D data object without needing to communicate or be synchronized on its computing operations with the other ALUs performing their calculations in parallel. This whole picture storage of the weights for the 3D data as well that this data is inputted into two additional CE units instantiated into each ALU allows each ALU to independently perform the 3D calculations without needing to communicate or be synchronized on its computing operations with the other ALUs performing their calculations in parallel. Note, the amount of overlap is controlled via software and can be more columns of additional data when the kernel is bigger than 3×3. Note, the overlap can be done without increasing width of reuse RAM. But the idea of carrying duplicate data across ALUs can still be done. The scheduler makes use of signaling wires to each ALU to communicate when to start a calculation and then receive notice back when a resultant output has been produced by the ALU from the calculation.

The neural network processor can reduce or remove access to external memory and instead use the internal Renew RAM and Reuse RAM. The neural network processor can reduce internal data movement by moving the larger amount of static data (weight or channel data) merely once to the Reuse RAM rather than having to move that large amount of data bytes around multiple times during a calculation. The Reuse RAM holds onto this static data until it is not needed which saves time and power consumption.

Figure 6:
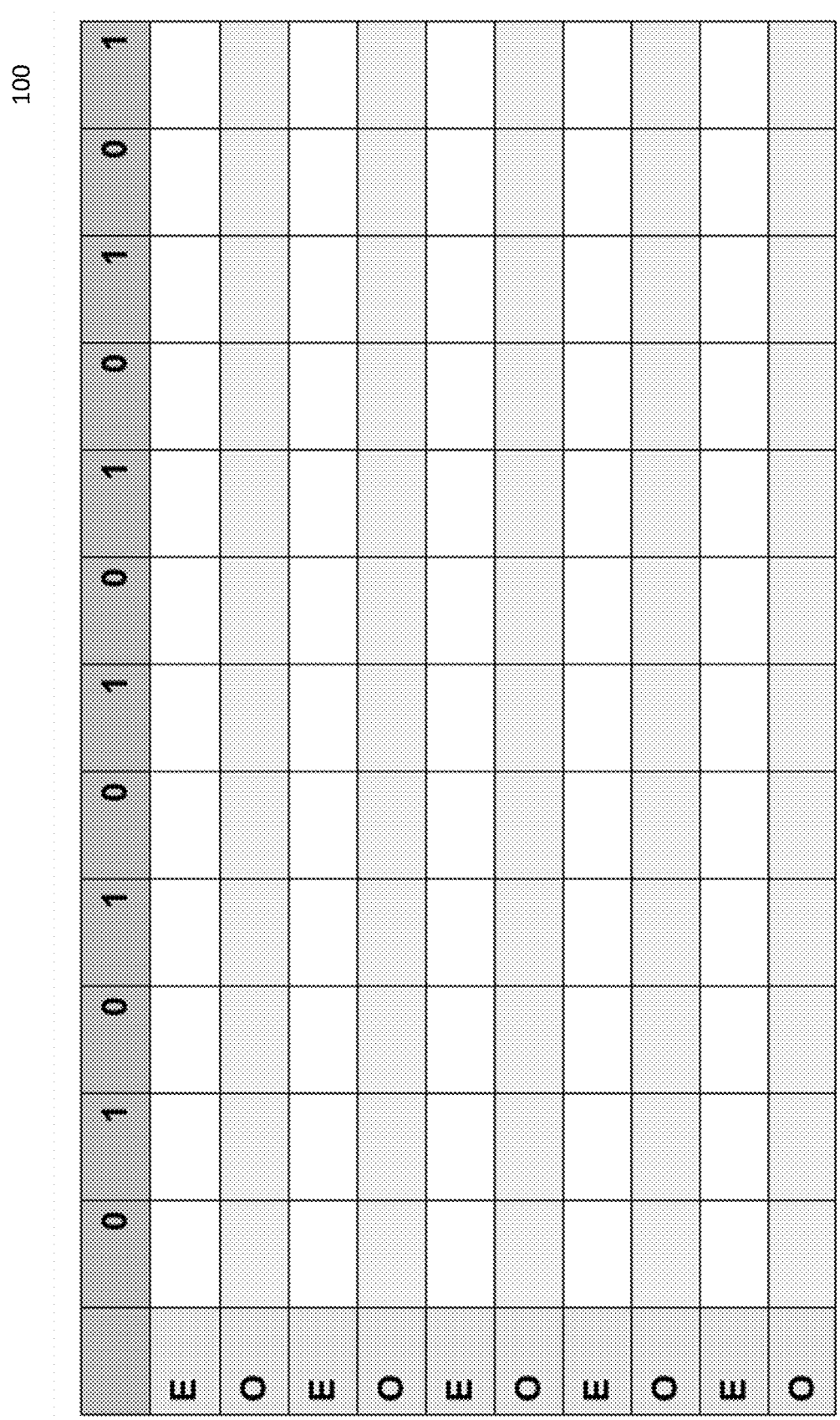
FIG. 6 illustrates a diagram of an example embodiment of a scheduler and an ALU configured to handle stride and max pool efficiently by dividing input data from input channels and weights from a neural network into even/odd rows and columns and then to process the weights and input data as even and odd segments.

FIG. 6 illustrates a diagram of an example embodiment of a scheduler and an ALU configured to handle stride and max pool efficiently by dividing input data from input channels and weights from a neural network into even/odd rows and columns and then to process the weights and input data as even and odd segments. The scheduler and each ALU of the integrated circuit 100 are configured to handle stride and max pool efficiently by dividing input data from input channels and weights from a neural network into even/odd rows and columns and then to process the weights and input data as even and odd segments.

For handling stride and max pooling operations the data is split into even and odd spaces. The EVEN/ODD splitting operation happens in the NODE. When the data is read from the DDR and sent to the SCH NODE does the even odd splitting operation. For example, initially the even space, even rows (EVEN_EVEN) will be read and calculations will be done using W0, W2, W6, W8 weights (assuming 3×3 matrix). Then odd space, even rows (EVEN_ODD) will be read and calculations will be done using W1 and W7. Then even space, odd rows (ODD_EVEN) will be sent and calculations will be done using W3 and W5. The finally odd space and odd column (ODD_ODD) will be sent for calculations with W4. The skip will be set to 0 for output layer that has stride set to 1, unless it is also going to a layer that has stride of 2. The data is written into four different segments before being processed by the SCH/ALU. Each segment stores an even/odd combination. So if the segments are called S0, S1, S2 and S3. S0 might store all E0 data, S1 might store all E1 data, S2 might store all O0 data and S3 might store all O1 data.

The neural network processor can achieve >95% utilization of ALUs, as well as support all types of neural networks for AI models and types of data. The neural network processor can use a security engine to encrypt and decrypt data for security and safety.

Figure 7:
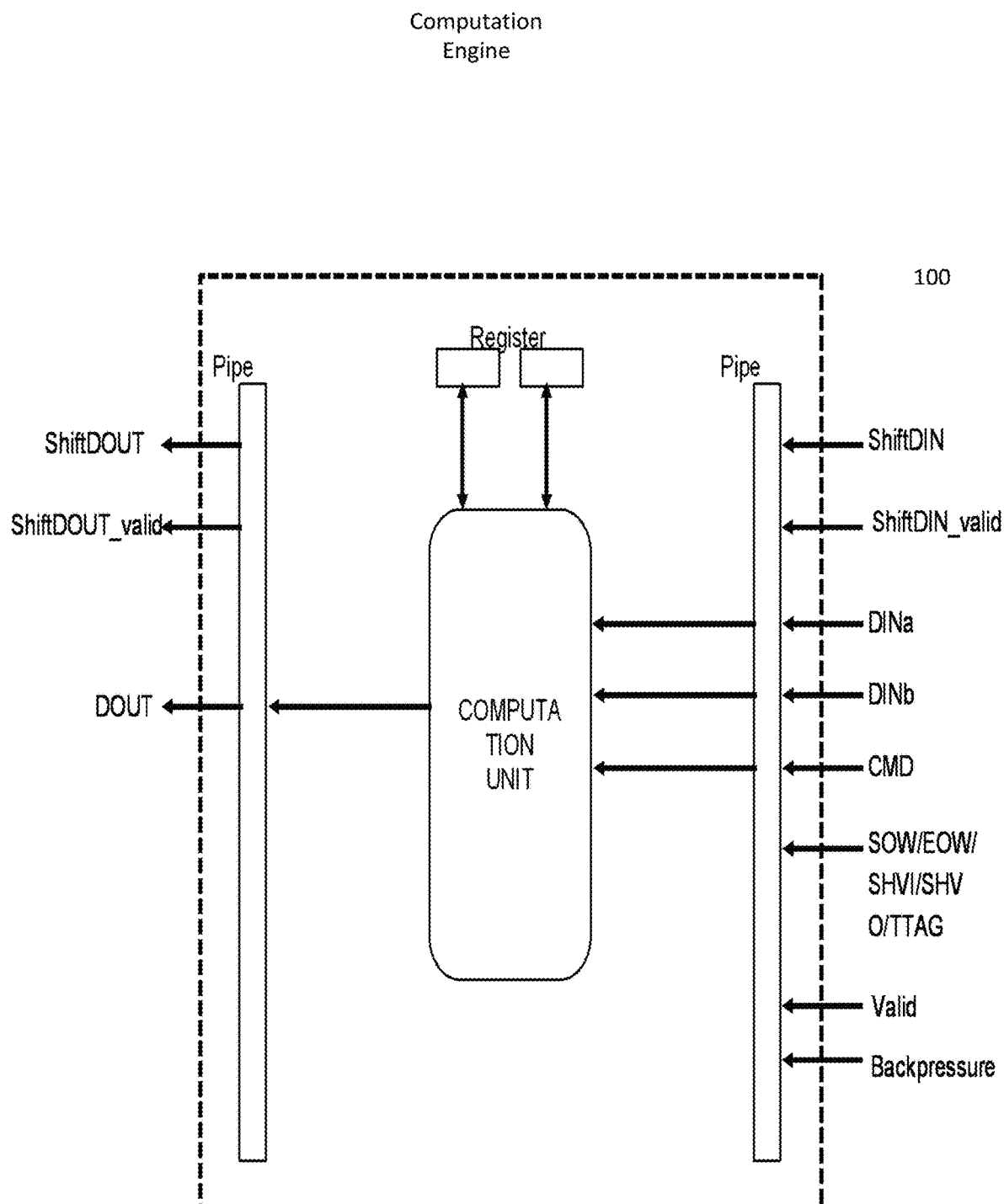
FIG. 7 illustrates a diagram of an example embodiment of an arithmetic logic unit that has multiple compute engines, where each neighboring compute engine is configured to communicate and receive a computed output of a downstream compute engine, except for an initial compute engine.

FIG. 7 illustrates a diagram of an example embodiment of an arithmetic logic unit of the integrated circuit 100 that has multiple compute engines, where each neighboring compute engine is configured to communicate and receive a computed output of a downstream compute engine, except for an initial compute engine.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus to efficiently process and execute Artificial Intelligence operations, comprising:
an integrated circuit with a tailored architecture to process and execute Artificial Intelligence operations, including computations for a neural network having sparse weights, wherein the sparse weights have a sparse weight value that is at least one of zero and non-important, where the integrated circuit contains a scheduler, a compiler, one or more arithmetic logic units (ALU), and one or more random access memories (RAM) configured to cooperate with each other to process and execute these computations for the neural network having sparse weights, wherein the compiler is configured to create a bit mask, and the bit mask removes sparse weights from calculation within the neural network.

2. The apparatus of claim 1, wherein:
the compiler is configured to create the bit mask that accompanies input data from input channels of the neural network, where the bit mask corresponds to a set of weights for the neural network when one or more of the weight values for the set of weights have the sparse weight value, where a first arithmetic logic unit is configured decode the bit mask to i) identify which weights from the set of weights have sparse weight values that should be 1) transferred across a communication bus into reuse RAM and 2) subsequently used in the computations for the neural network and ii) identify which weights that have a sparse weight value, where 1) the weights that have a sparse weight value will have a calculation for that weight skipped as well as 2) the weights that have the sparse weight value will not be transferred across the communication bus into the reuse RAM.

3. The apparatus of claim 1, comprising:
a reuse RAM configured to cooperate with the scheduler to be loaded a single time per calculation session with a larger amount of data between i) a set of weights and ii) input data from input channels, for the neural network in which the larger amount of data is to be reused multiple times during a given calculation session, where the larger amount of data loaded into the reuse RAM stays put during the calculation session, which generates multiple outputs, where the larger amount of data is loaded into the reuse RAM merely once; rather than, having to move that large amount of data bytes around multiple times during the calculation session.

4. The apparatus of claim 3, comprising:
a mode controller and a compiler configured to cooperate to receive a software input from the user on whether to operate the integrated circuit in one of multiple operational modes in order to more efficiently perform calculations for different types of neural network, where in a first mode, the input data from input channels is loaded into the reuse RAM and the set of weights for the neural network are loaded into a renew RAM, and where in a second mode, the input data from input channels is loaded into the renew RAM and the set of weights for the neural network are loaded into the reuse RAM.

5. The apparatus of claim 3, comprising:
where each arithmetic logic unit is configurable to be instantiated with multiple compute engines via a user configurable register transfer language (RTL) setting, where each arithmetic logic unit contains an instance of a renew RAM and an instance of the reuse RAM to i) feed the input data and the set of weights into each compute engine and ii) to also store an output result from a calculation from that compute engine.

6. The apparatus of claim 1, comprising:
where each arithmetic logic unit has multiple compute engines, where each neighboring compute engine is configured to communicate and receive a computed output of a downstream compute engine, except for an initial compute engine, where a first compute engine has a register to store an output of the downstream compute engine as its input.

7. The apparatus of claim 6, comprising:
where a first ALU has a RAM width of memory cells set in a reuse RAM to have an additional two or more columns of greater than an amount of columns needed to store input data from input channels, where the additional two or more columns of data from the input data for a 3D data object are configured to store a left data value and a right data value of a current weight being calculated by the first ALU, in order to allow the first ALU to independently perform the calculations for the 3D data object without needing to communicate or be synchronized on its computing operations with the other ALUs performing their calculations in parallel.

8. The apparatus of claim 1, where the scheduler and a first ALU are configured to handle stride and max pool efficiently by dividing input data from input channels and weights from a neural network into even/odd rows and columns and then to process the weights and input data as even and odd segments.

9. A method to efficiently process and execute Artificial Intelligence operations, comprising:
configuring an integrated circuit with a tailored architecture to process and execute Artificial Intelligence operations, including computations for a neural network having sparse weights, wherein the sparse weights have a sparse weight value that is at least one of zero and non-important, where the integrated circuit contains a scheduler, a compiler, one or more arithmetic logic units (ALU), and one or more random access memories (RAM) configured to cooperate with each other to process and execute these computations for the neural network having sparse weights, wherein the compiler is configured to create a bit mask, and the bit mask removes sparse weights from calculation within the neural network.

10. The method of claim 9, further comprising:
configuring the compiler to create the bit mask that accompanies input data from input channels of the neural network, where the bit mask corresponds to a set of weights for the neural network when one or more of the weight values for the set of weights have the sparse weight value, where a first arithmetic logic unit is configured decode the bit mask to i) identify which weights from the set of weights have sparse weight values that should be 1) transferred across a communication bus into reuse RAM and 2) subsequently used in the computations for the neural network and ii) identify which weights that have a sparse weight value, where 1) the weights that have a sparse weight value will have a calculation for that weight skipped as well as 2) the weights that have the sparse weight value will not be transferred across the communication bus into the reuse RAM.

11. The method of claim 9, comprising:
configuring a reuse RAM to cooperate with the scheduler to be loaded a single time per calculation session with a larger amount of data between i) a set of weights and ii) input data from input channels, for the neural network in which the larger amount of data is to be reused multiple times during a given calculation session, where the larger amount of data loaded into the reuse RAM stays put during the calculation session, which generates multiple outputs, where the larger amount of data is loaded into the reuse RAM merely once; rather than, having to move that large amount of data bytes around multiple times during the calculation session.

12. The method of claim 11, comprising:
configuring a mode controller and a compiler to cooperate to receive a software input from the user on whether to operate the integrated circuit in one of multiple operational modes in order to more efficiently perform calculations for different types of neural network, where in a first mode, the input data from input channels is loaded into the reuse RAM and the set of weights for the neural network are loaded into a renew RAM, and where in a second mode, the input data from input channels is loaded into the renew RAM and the set of weights for the neural network are loaded into the reuse RAM.

13. The method of claim 11, comprising:
where each arithmetic logic unit is configurable to be instantiated with multiple compute engines via a user configurable register transfer language (RTL) setting, where each arithmetic logic unit contains an instance of a renew RAM and an instance of the reuse RAM to i) feed the input data and the set of weights into each compute engine and ii) to also store an output result from a calculation from that compute engine.

14. The method of claim 9, comprising:
where each arithmetic logic unit has multiple compute engines, where each neighboring compute engine is configured to communicate and receive a computed output of a downstream compute engine, except for an initial compute engine, where a first compute engine has a register to store an output of the downstream compute engine as its input.

15. The method of claim 14, comprising:
where a first ALU has a RAM width of memory cells set in a reuse RAM to have an additional two or more columns of greater than an amount of columns needed to store input data from input channels, where the additional two or more columns of data from the input data for a 3D data object are configured to store a left data value and a right data value of a current weight being calculated by the first ALU, in order to allow the first ALU to independently perform the calculations for the 3D data object without needing to communicate or be synchronized on its computing operations with the other ALUs performing their calculations in parallel.

16. The method of claim 9, where the scheduler and a first ALU are configured to handle stride and max pool efficiently by dividing input data from input channels and weights from a neural network into even/odd rows and columns and then to process the weights and input data as even and odd segments.

* * * * *